(12) United States Patent
Nikolaevich

(10) Patent No.: US 6,198,866 B1
(45) Date of Patent: Mar. 6, 2001

(54) LIGHT GUIDING APPARATUS

(76) Inventor: Gorbel Vladimir Nikolaevich, ul. Teply Stan, d. 5, korp. 3, kv. 130 Moscow (RU)

(*) Notice: Subject to any disclaimer, the term of this patent is extended or adjusted under 35 U.S.C. 154(b) by 0 days.

(21) Appl. No.: 09/341,966

(22) PCT Filed: Jan. 20, 1998

(86) PCT No.: PCT/RU98/00008
   § 371 Date: Sep. 16, 1999
   § 102(e) Date: Sep. 16, 1999

(87) PCT Pub. No.: WO98/32039
   PCT Pub. Date: Jul. 23, 1998

(30) Foreign Application Priority Data

Jan. 20, 1997 (RU) .................................................. 97100625

(51) Int. Cl.$^7$ .................................................. G02B 6/06
(52) U.S. Cl. .................................................. 385/115; 385/114
(58) Field of Search .................................................. 385/115, 134, 385/116, 121

(56) References Cited

U.S. PATENT DOCUMENTS

| | | | |
|---|---|---|---|
| 4,952,042 | 8/1990 | Pinson | 350/567 |
| 5,323,480 * | 6/1994 | Mullaney et al. | 385/135 |
| 5,734,776 * | 3/1998 | Puetz | 385/134 |

FOREIGN PATENT DOCUMENTS

| | | |
|---|---|---|
| 03019622 | 1/1991 | (JP) . |
| 1430928 | 10/1988 | (RU) . |
| 1555598 | 4/1990 | (RU) . |
| WO 94/08425 | 4/1994 | (WO) . |

* cited by examiner

*Primary Examiner*—Hung N. Ngo
(74) *Attorney, Agent, or Firm*—Fulbright & Jaworski L.L.P.

(57) ABSTRACT

The present invention relates to the field of illumination engineering, particularly to structural elements of lighting devices, and may be used in luminaires, searchlights, lanterns with a directed light and dynamic beam movement, in controlled scanning devices. The invention makes it possible to transmit a focused light beam and to control thereof by the fact that in a light guiding apparatus comprising a bundle of fiber light guides fastened together at an input end face which is mounted to rotate about its own axis, said light guides are fastened together at an output end face with a relative position of the fibers being equal at the both ends which form the input and output end faces perpendicular to the light guide axes, wherein the output end face of the bundle is mounted to rotate about an axis which is perpendicular to the axis of the input end face, by means of the turning mechanism hinged to a rotating mechanism installed to rotate the input end face.

2 Claims, 1 Drawing Sheet

Light Guiding Apparatus

LIGHT GUIDING APPARATUS

TECHNICAL FIELD

The present invention relates to the field of illumination engineering, particularly to structural elements of lighting devices, and may be used in luminaires, searchlights, lanterns with a directed light and dynamic beam movement, in controlled scanning devices.

BACKGROUND ART

There have been known lighting devices with a directed light, the so-called controlled scanning devices, comprising a case which includes a light source, a unit of controlled effects and an objective. On the outside part of the case, there is installed a controlled mirror as a light guiding apparatus. A beam from the light source, through the unit of effects and the objective, falls on the mirror mounted to rotate about the beam axis and about an axis perpendicular to the beam axis [see, for example, the advertising booklet "Super Scan ZOOM", CLAY PAKY Professional Show Lighting, 1994].

Changing the mirror turning angles about two axes by means of turning mechanisms results in the change of a light beam direction. The controlled scanning device possesses the effect of a beam movement in the space (the beam scanning), the effect of a local lighting of the object in the space, the color beam effect and the template position effect.

A major disadvantage of the controlled scanning devices with a scanning mirror is that a working space in which the objects are within reach of the beam is greatly limited due to the impossibility to increase the mirror turning angles, especially about an axis perpendicular to the beam axis.

There has been known the use of light guides made of fiber bundles with a relative position of fibers at both ends being equal, for example, in the device for transmitting and zooming an image [see, for example, the USSR Inventors' Certificate No. 1,430,928 A1 G02B 6/06, 1988]. This device comprises a regular light guide bundle with planar rectangular ends which functions as a light guiding apparatus. At a small input end face, light guides are tightly packed in strings, said strings being packed without a gap. At a large output end face, strings are packed with a gap. At the output end face, light guides in the strings are tightly packed, said strings being equidistant from each other. The light guide ends at the output end face are made scattering; opposite thereof, there are mounted cylindrical lenses with their generatrixes being parallel with the strings.

This device is used for zooming an image, particularly for displaying slides and an enlarged TV image.

A disadvantage of the device for transmitting and zooming an image is that it may not be used for transmitting a locally directed light transmission and image projection on the plane.

The closest prior art has been disclosed in a light guiding apparatus employed in an ornamental luminaire [see, the USSR Inventors' Certificate No. 1,555,598 A1 F21P 3/00, 1990]. This apparatus comprises a bundle of fiber light guides. Light guides are fastened together at one end, thus forming an input end face. The input end face is mounted to rotate about its own axis; the entire bundle may rotate, too. Output end faces of the light guides form a spherical surface. In so doing, one may achieve the effect of changing a position of luminous light guide end faces from the center of said spherical surface to the periphery thereof.

Advantages with this apparatus reside in the possibility of producing a spacious light effect and simplicity of the design.

Major drawbacks associated with the apparatus are that it allows no possibility to produce a focused beam due to the absence of a single output end face, no possibility to project an image on the plane and to control the beam.

DISCLOSURE OF THE INVENTION

The object of the present invention is to provide the possibility of transmitting a focused light beam.

Another object of the present invention is to provide the possibility of controlling the beam.

A technical effect to be attained in accordance with the present invention consists in the following:
   the possibility to produce a monochrome beam coloring;
   the possibility of image transmission and image projection;
   the possibility of a dynamic beam movement in the space;
   the possibility of a local lighting of the objects in the space.

These and other technical aims are solved in accordance with the present invention by the fact that in a light guiding apparatus comprising a bundle of fiber light guides fastened together at an input end face which is mounted to rotate about its own axis, said light guides are fastened together at an output end face with a relative position of the fibers being equal at the both ends which form the input and output end faces perpendicular to the light guide axes, wherein the output end face is mounted to rotate about an axis which is perpendicular to the axis of the input end face, by means of the turning mechanism hinged to a rotating mechanism installed to rotate the input end face. In so doing, the output end face is fastened in the turning mechanism in a turn position with respect to the input end face at an angle of 90°–270° about the beam axis.

A bundle of fiber light guides is made such that a relative position of fibers is equal at the both ends, which permits transmission of undistorted images (an image to be projected on the input end face will appear undistorted at the output end face).

Combined fiber ends form the output end face, which enables one to transmit a directionally focused light beam. Input and output end faces are made planar with their planes being perpendicular to the fiber axes, which allows minimization of a fraction of the reflected and refracted light when the beam frontally enters the input end face and frontally leaves the output end face. The output end face is mounted to rotate about an axis which is perpendicular to the axis of the input end face—this makes it possible to effectively change a position of the output end face with respect to the input end face. In so doing, the beam may reach any point on a plane formed by the beam movement when changing a turning angle of the output end face. Here, the input end face axis lies in this plane (as a consequence), which is convenient for a turning angle readout.

Change in a beam position occurs at the expense of changing a turning angle of the output end face fastened in the turning mechanism which is attached to a rotating mechanism installed to rotate the input end face. When a turning angle of said rotating mechanism changes about the axis of rotation, there is a turning of an imaginary plane formed by passing the beam with the change of a turning angle of the output end face. In so doing, the beam falls on any point of a semispherical surface. Said turning and rotating mechanisms are coupled because the light guide bundle is integer and can not be separated. Change in a relative position of the output end face is possible thanks to a hinge joint between said turning and rotating mechanisms.

In the course of changing the turning angles, a distortion of the light guide bundle takes place. In order to compensate for such distortion, it is necessary that a plane of the output end face be fixed in the turning mechanism in a turn position with respect to the input end place at an angle of 90°–270° about the beam axis. This enables the bundle, when bending, to maintain a relatively round cross-section along the full length at the expense of the output end face secured in the turning mechanism in a turn position with respect to the input end face at an angle of 90°–270° about the beam axis.

BRIEF DESCRIPTION OF THE DRAWINGS

The various objects and advantages of the present invention will be more readily apparent from the following description when read in conjunction with the appended drawings, in which.

BEST MODE FOR EMBODYING THE INVENTION

Figure 1:
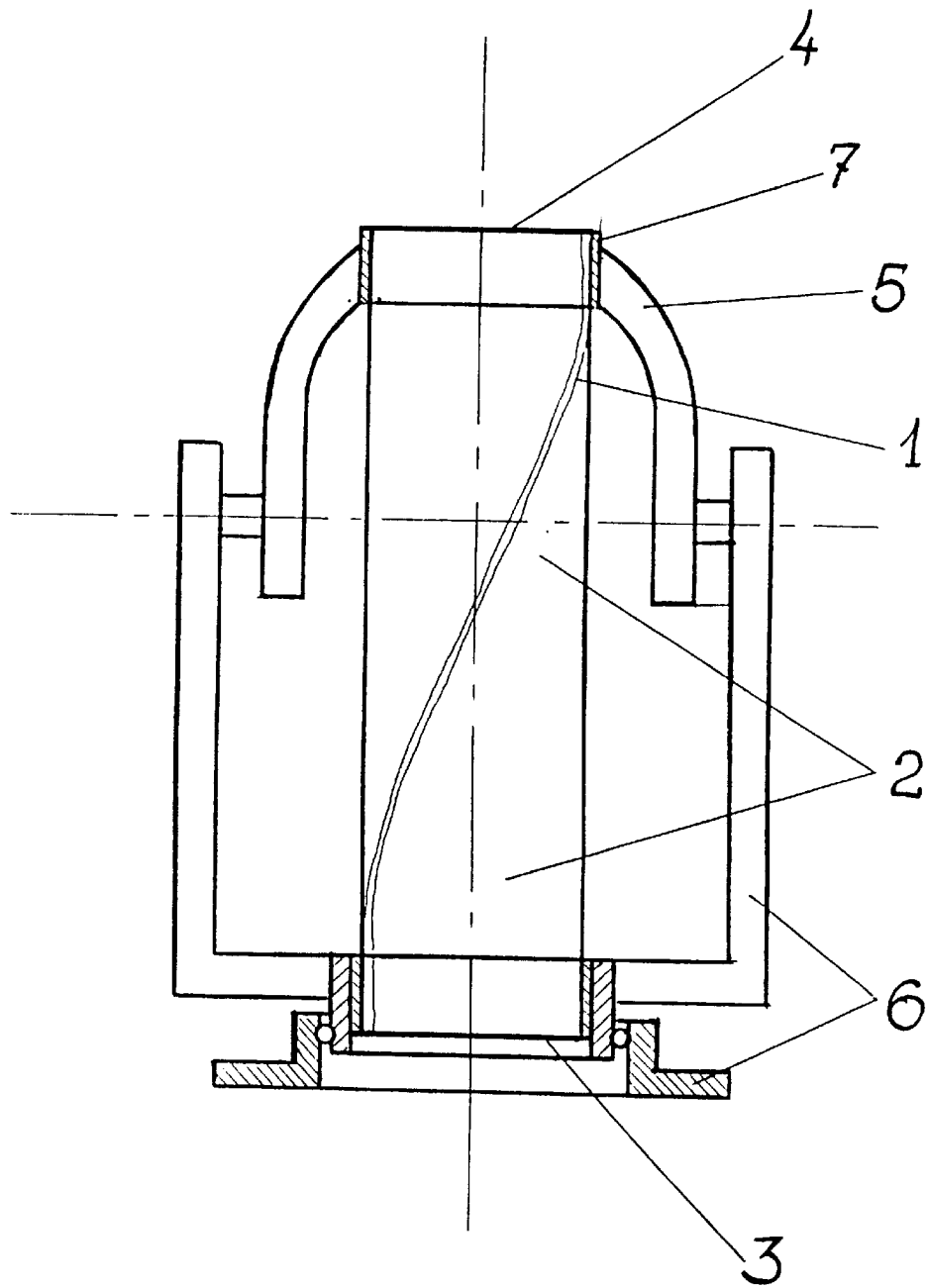
FIG. 1 is a schematic general view showing a light guiding apparatus where: 1—a fiber light guide; 2—a light guide bundle; 3—an input end face; 4—an output end face; 5—a turning mechanism; 6—a rotating mechanism.

The present invention will be explained in detail with reference to FIG. 1. A light guiding apparatus according to the present invention operates as follows. A light beam originating from a light source located co-axially with an input end face 3 finds itself in the input end face and emerges from an output end face 4 of a bundle 2 of fiber light guides 1.

A turning mechanism 5 bends a light guide bundle 2 moving the output end face 4 in the line of circumference. In so doing, a direction of the light beam is perpendicular to a tangent to this circumference.

A rotating mechanism 6 turns the entire light guide bundle 2 with the turning mechanism 5 about the axis of the input end face, wherein there is a turning of an imaginary plane formed by passing the beam when the turning mechanism turns from one extreme to another extreme.

To ensure favorable conditions of use under distortion of the light guide bundle when changing a turning angle, without tension of the fibers and without an unnecessary fiber sagging, the axis of rotation is fixed at a height of $2/3$ of a free length (the length of a portion of fibers which is not fastened in the fixing mechanisms) of the bundle, wherein the light guide bundle length equals three diameters of the bundle.

Said turning and rotating mechanisms are actuated by step-to-step motors, and their exploitation experience is widely recognized in designing controlled scanning devices. By using said step-to-step motors it is possible to adjust a turning angle and a rotating angle of the light guiding apparatus to a very high precision. In so doing, it is also possible to perform a high-fidelity pointing of the beam to a required place in the stage, dancing platform, etc.

If and when necessary, in order to provide an additional focusing, lenses may be mounted at the input and output end face in line with the beam axis.

Application of the light guiding apparatus as a device which substitutes for the mirror in accordance with the present invention, will enable one to extend a sphere within the reach of hit of the light beam while preserving all the advantages of controlled scanning devices.

Although the present invention has been described with reference to a preferred embodiment, the invention is not limited to the details thereof, and various changes and modifications obvious to one skilled in the art to which the invention pertains are deemed to be within the spirit, scope and contemplation of the invention as further defined in the appended claims.

What is claimed is:

1. A light guiding apparatus comprising a bundle of fiber light guides fastened together at an input end face which is mounted to rotate about its own axis, and a rotating mechanism installed to rotate the input end face, characterized in that it comprises a turning mechanism, said light guides are fastened together at an output end face with a relative position of the light guide end faces being equal at the input and output end faces of the bundle which are perpendicular to the light guide axes, an output end face of the bundle is mounted to rotate about an axis which is perpendicular to the axis of the input end face, by means of the turning mechanism hinged to the rotating mechanism installed to rotate the input end face.

2. An apparatus as claimed in claim 1, characterized in that the output end face is fastened in the turning mechanism in a turn position with respect to the input end face at an angle of 90°–270° about the beam axis.

* * * * *